United States Patent
Iverson et al.

(10) Patent No.: US 10,204,447 B2
(45) Date of Patent: Feb. 12, 2019

(54) 2D IMAGE PROCESSING FOR EXTRUSION INTO 3D OBJECTS

(71) Applicant: Microsoft Technology Licensing, LLC, Redmond, WA (US)

(72) Inventors: Kristofer N. Iverson, Redmond, WA (US); Emmett Lalish, Seattle, WA (US); Seth Orr, Seattle, WA (US); Milos Bazelides, Bratislava (SK); Jan Jakubovic, Bratislava (SK); Anton Mateasik, Bratislava (SK); Vladimir Sisolak, Bratislava (SK); Tibor Szaszi, Bratislava (SK)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/157,219

(22) Filed: May 17, 2016

(65) Prior Publication Data
US 2017/0132837 A1    May 11, 2017

Related U.S. Application Data

(60) Provisional application No. 62/252,341, filed on Nov. 6, 2015.

(51) Int. Cl.
| | | |
|---|---|---|
| *G06T 17/20* | (2006.01) | |
| *G06T 17/10* | (2006.01) | |
| *G06T 17/00* | (2006.01) | |

(52) U.S. Cl.
CPC .............. *G06T 17/20* (2013.01); *G06T 17/00* (2013.01); *G06T 17/10* (2013.01); *G06T 2219/2012* (2013.01)

(58) Field of Classification Search
None
See application file for complete search history.

(56) References Cited

U.S. PATENT DOCUMENTS

| | | |
|---|---|---|
| 7,630,580 B1 | 12/2009 | Repenning |
| 8,059,888 B2 | 11/2011 | Chen et al. |

(Continued)

FOREIGN PATENT DOCUMENTS

| | | |
|---|---|---|
| WO | 9915945 A2 | 4/1999 |
| WO | 2007148219 A2 | 6/2007 |
| WO | 2008112794 A2 | 9/2008 |

OTHER PUBLICATIONS

"MakerBot Printshop"; https://itunes.apple.com/us/app/markerbot-printshop/id884304128?mt=8; Itunes Apple Inc.; 2016; accessed Mar. 3, 2016; 2 pages.

(Continued)

*Primary Examiner* — Michelle Chin

(57) ABSTRACT

Techniques are described for transforming image data, such as two dimensional (2D) or partial three dimensional (3D) image data, into a 3D model. Upon receiving image data including color information, the image data may be converted into a height map based on the color information. The height map may be used to construct an image data mesh, which forms a 3D model. In some aspects, constructing the image data mesh may include associating vertices with pixels of the image data, connecting neighboring vertices to define at least one surface, applying texture to at least one of the surfaces, generating bottom and side surfaces, and connecting the bottom and side surface(s) to the textured surface to enclose a volume within the 3D model. In some aspects, the height map may include an edge based height map, such that color distances between pixels may be used form edges from the image data.

20 Claims, 16 Drawing Sheets

(56) References Cited

U.S. PATENT DOCUMENTS

| | | | |
|---|---|---|---|
| 8,699,787 | B2 | 4/2014 | Van Den Hengel et al. |
| 2002/0196965 | A1 | 12/2002 | Wallace et al. |
| 2005/0053275 | A1 | 3/2005 | Stokes |
| 2010/0039427 | A1 | 2/2010 | Yun et al. |
| 2010/0134491 | A1* | 6/2010 | Borland .................. G06T 15/06 345/424 |
| 2010/0194863 | A1 | 8/2010 | Lopes et al. |
| 2010/0225973 | A1 | 9/2010 | Keithley et al. |
| 2011/0285707 | A1 | 11/2011 | Repenning |
| 2013/0044945 | A1 | 2/2013 | Nykyforov |
| 2015/0130797 | A1 | 5/2015 | Chen et al. |
| 2015/0209012 | A1 | 7/2015 | Oh et al. |
| 2017/0132836 | A1 | 5/2017 | Iverson et al. |

OTHER PUBLICATIONS

U.S. Appl. No. 15/052,051; Non-Final Office Action; dated Jun. 2, 2017; 22 pages.

"International Search Report and Written Opinion Issued in PCT Application No. PCT/US2017/032787", dated Jul. 27, 2017, 13 Pages.

Pol, et al., "Semi-Automatic Figure-Ground Segmentation for 2D-to-3D Image Conversion based on Color and Compactness", In Technical Note—TN-2009-00408, Aug. 2009, 66 Pages.

Wannida, et al., "Non-Separable Weighted Median-Cut Quantization for Images with Sparse Color Histogram", In Proceedings of International Symposium on Intelligent Signal Processing and Communications Systems, Nov. 4, 2012, 6 Pages.

"Final Office Action Issued in U.S. Appl. No. 15/052,051", dated Nov. 7, 2017, 18 Pages.

"Non Final Office Action Issued in U.S. Appl. No. 15/052,051", dated Apr. 4, 2018, 18 Pages.

"International Search Report and Written Opinion Issued in PCT Application No. PCT/US16/059353", dated Jan. 2, 2018, 11 Pages.

"Final Office Action Issued in U.S. Appl. No. 15/052,051", dated Oct. 16, 2018, 17 Pages.

* cited by examiner

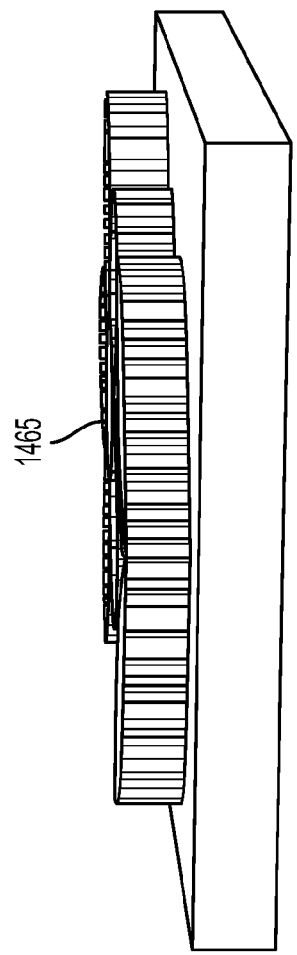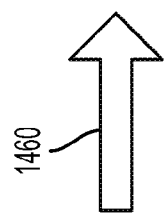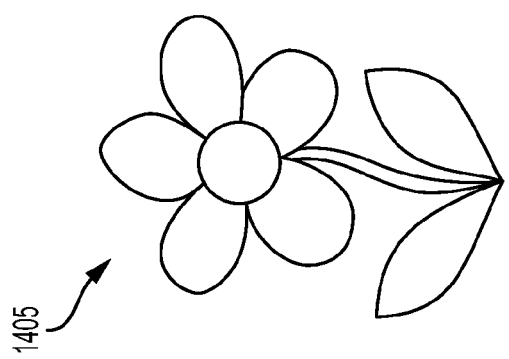
FIG. 14B

2D IMAGE PROCESSING FOR EXTRUSION INTO 3D OBJECTS

CROSS REFERENCE TO RELATED APPLICATIONS

This application claims benefit under 35 U.S.C. § 119(e) of U.S. Provisional U.S. Patent Application No. 62/252,341, filed Nov. 6, 2015, the contents of which are incorporated herein by reference in its entirety.

TECHNICAL FIELD

This disclosure relates generally to three dimensional (3D) modeling, and more specifically to generating 3D objects from 2-dimensional (2D) or partial 3D image data.

BACKGROUND

Creating 3D image data from 2D image data, such as 3D objects, presents particular challenges both in terms of the complexity of modeling 3D objects and of generating 3D objects to accurately portray real-life things. Adding to these challenges is the recent application of 3D data to 3D printing, which requires full 3D object definition to produce a complete object or product. Current techniques used to create 3D objects or 3D image data include using CAD/CAM software products, using 3D scanning sensors, and the like. However, these and other 3D modeling techniques often require specific and comprehensive technical expertise, often require expensive software tools or chains of such tools, or even require dedicated hardware, such as sensors. Accordingly, there is a need for more efficient, more intuitive, easily accessible, and more user friendly techniques for generating 3D data.

SUMMARY

Illustrative examples of the disclosure include, without limitation, methods, systems, and various devices. In one aspect, techniques for transforming image data into a three dimensional (3D) model may include obtaining two dimensional (2D) or partial 3D image data, including color information. The 2D or partial 3D image data may be converted into a height map based on the color information. An image data mesh may be constructed from the height map, to define a 3D model.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which:

FIGS. 14A and 14B depict example transformations of 2D image data to 3D image data using the stamp technique according to the operational procedure depicted in FIG. 13.

DETAILED DESCRIPTION OF ILLUSTRATIVE EMBODIMENTS

Figure 1:
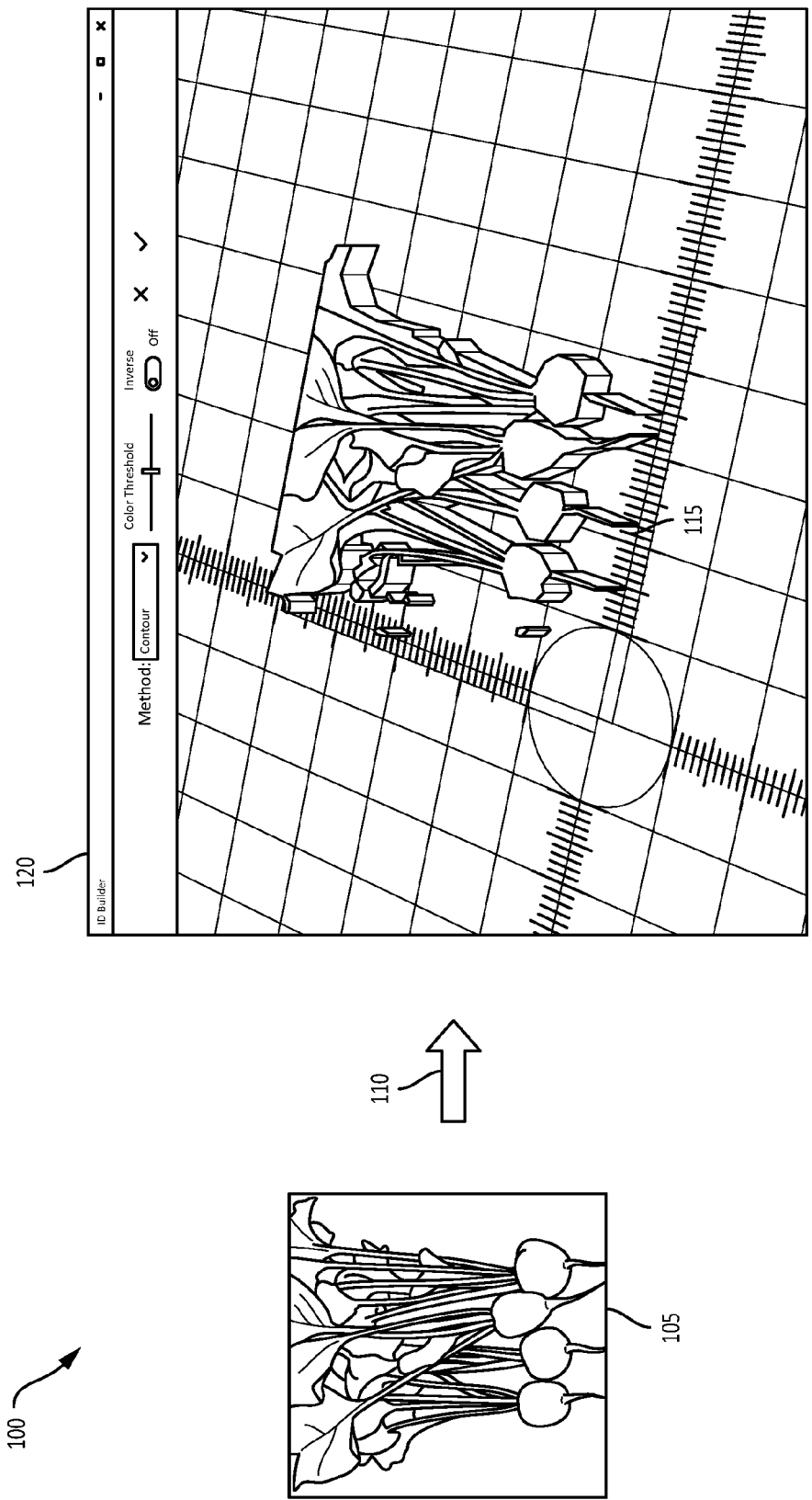
FIG. 1 depicts an example of a transformation of 2D image data into 3D image data.

Systems and techniques are described herein for transforming 2D image data into 3D image data, such as one or more 3D objects. In some aspects, the transformed 3D data may be used and/or further modified for a number of applications, such as 3D printing, 3D modeling, 3D virtualization, and various other applications. The described techniques may include obtaining 2D image data, or in some cases, partial 3D image data, such as photos from a camera implemented in a mobile device or smart phone, from one or more local or remote image files, etc. Color data of the 2D image data may be used to calculate or determine various segmentations of the image and assign height values to portions of the segmentations to create extruded 3D image data from the 2D image data. In some aspects, texture information may be remapped onto the 3D object. The 3D image/object may then be rendered, for example, including color and/or texture for display, manipulation, printing via a 3D printer, or for various other applications and purposes. In some cases, a user interface may be provided that enables selection of different 3D transformation techniques, enables various adjustments to be made to the process in real-time, and enables visualization and display of differences in transformation techniques used and configuration parameters selected.

In one example, a photo of a pen and paper drawing may be loaded into a 3D builder application, for example, running on a computing device, mobile device, smart phone, tablet, laptop, etc., which may convert the photo into a 3D object via the described techniques. The user interface associated with the 3D builder application may provide for selections and customizations that, in real-time or near real-time, modify how the photo is transformed into a 3D object and various parameters related thereto. The described techniques may enable complex 3D rendering from 2D images or photos, line drawings, charts, partial 3D image data, etc., and may enable more efficient capture and modification of 3D content from the real world, without requiring advanced expertise or dedicated hardware.

In some aspects, the color data of the 2D image/image data may be analyzed on a pixel by pixel basis. In one example technique, referred to herein as contour detection, pixels, such as proximate or neighboring pixels with different intensities, may be detected and identified. The extent to which the pixel intensities, and in one example difference between intensities of neighboring pixels, trigger identification may be configured, for example, via one or more thresholds. Identified pixels (pixels having pixel intensities/differing pixel intensities above or below one or more selected thresholds) may be linked or connected to form and approximate boundaries or edges in the image data. The approximated edges may then be connected to form contour loops. The contour loops, which may each enclose an area in the image data, may be of any shape, size etc. The contour loop(s) may be extruded and triangulated, and top (visible), bottom, and side surfaces may be generated around each contour loop to form the 3D image data/object. It should be appreciated that other values of the 2D image data may be used to form contours as described above, such as color values (RGB or RGBA), and so on.

In another example technique, the 2D image data may be converted into a height map, for example, after pre-processing of the 2D image data. In one aspect, a flood fill may be applied to the 2D image, and the number of colors in the image data may be reduced, for example, by applying a modified median-cut color quantization algorithm to the 2D image data. In some aspects, blur or box blur may be applied to the image data. The preprocessed image data may then be converted to a height map, which may be output as a grey-scale bitmap. In some aspects, alpha channel information may be used to filter out transparent pixels. The height map may then be used to construct an image data mesh that defines the 3D object, for example, by associated vertices with pixels of the image data, connecting neighboring vertices, applying texture to the top surface of the 3D object, and generating bottom and side surfaces to enclose a volume within the 3D object. In some aspects, the texture applied may include the color reduced image data. In some cases, the geometry of the 3D object may be simplified to reduce the mesh size, for example, for more efficient storage, rendering, etc.

In another example technique, referred to herein as edge detection, preprocessing of the 2D image data may be performed, for example, as similarly described above with respect to the height map technique. The preprocessed image data may be converted to an edge-based height map, such as by generating or mapping color distance of neighboring or proximate pixels to define edges in the image. In some aspects, alpha channel information may be used, if available, to remove transparent pixels from the edge-based height map. An image data mesh may then be constructed from the edge-based height map, via a similar process as described above with respect to the height map technique. In some cases, the mesh may be reduced in size, for example, by simplifying the geometry of the 3D object/image data.

In yet another example technique, referred to herein as the stamp technique, blur, or a blur filter, which may be configurable, may be applied to the 2D image data to remove sharp edges from the 2D image. The blurred image may then be converted to black and white, for example, using an ordered dithering scheme. An image data mesh may then be constructed from the black and white image data, for example, by connecting neighboring black pixels with edges to create triangles, and generating side and bottom surfaces to form the mesh.

In some aspects, blurring may be performed at the pre-processing stage, or in some aspects, during processing, or during post-processing of the 2D image data, for example, via one or more user inputs (e.g., a sliding scale or bar) selected via the user interface. In some cases, the user interface may provide for an inverse selection, which may invert height values, color, etc., of the image data. The user interface may additionally or alternatively provide resolution selections, color selections (e.g., for color reduction in the generation of height maps), and other selections or options.

FIG. 1 depicts an example of a transformation of 2D image data into 3D image data 100, in accordance with some of the described techniques. 2D image data 105 may be selected or obtained, for example, by retrieving or accessing one or more image files (JPEG, PNG, BMP, etc.) from a local or remote location, such as in a memory of a client device or in a remote memory, over one or more communication networks. The 2D image 105 may also be captured, for example, via a camera integrated with or in communication with the client device, and may be automatically imported into a 3D modeling or building application upon selection. The image data 105 may be imported and rendered in 3D at operation 110 as 3D image data 115 in a user interface 120.

Figure 2:
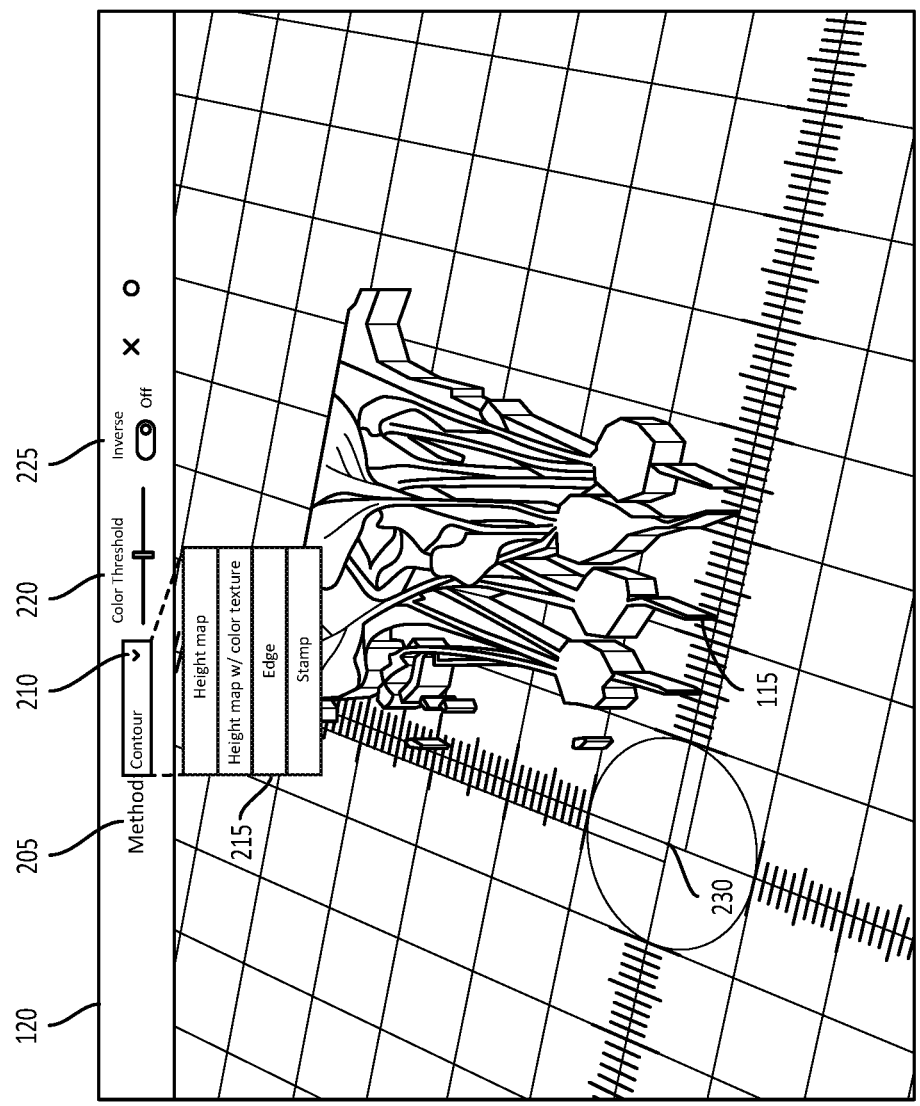
FIG. 2 depicts an example user interface of a 3D modeling or builder application for transforming 2D image data into 3D image data.

FIG. 2 illustrates a more detailed representation of user interface 120 (as depicted in FIG. 1), which may be executed on a client device and in some embodiments may be associated with a 3D builder application. A method or technique 205 may be selected to specify how the 2D image data 105 is transformed into 3D image data 115. The user interface 120 may display a selected transformation technique 205 and may also display a selectable icon 210 that upon selection, displays other types of 3D transformation techniques, such as height map, height map with color texture, edge, and stamp, for example, in a drop down menu or other window 215. In one aspect, a color threshold selection item 220 may also be displayed, for example, when the contour transformation method is selected. The color threshold selection item 220 may determine what color threshold is used to detect contours in the 2D image data 105. In some aspects, the color threshold selection item 220 may display a bar and slider icon, such that user input may move and select a color threshold from a range of values represented by the position of the slider. In some aspects, the color threshold may correspond to pixel intensity or color value (e.g. RGB or RGBA). An inverse selection item, such as a toggle or button 225, may configure the 3D builder application to invert the 3D image data 115, for example, by converting the selected threshold to the opposite of a selected maximum or minimum value. In one aspect, for example, when the contour method is selected, an inverse selection 225 may modify the 3D object to switch height values (e.g., change each height or z-direction value to the reverse sign, positive to negative or vice versa, when the object is displayed in a 3D Cartesian coordinate system/plane).

In some aspects, user interface 120 may display the 3D image data 115 in a grid or coordinate plane 230, such as a 3D grid or plane. The user interface 120 may provide panning controls, zoom controls, and controls to change the perspective view of the 3D object 115, for example, to enable more efficient manipulation and visualization of the 3D object/data 115.

In another aspect, a blur selection item (not shown) may additionally or alternatively be provided. The blur selection item may include a slider or other visual means for making a selection from a range of blur values (e.g., 0 through 8, or other range of values), for example, to smooth edges of the 3D image data/object 115 post transformation, or for modification of preprocessing of the 2D image data prior to the transformation. In yet another aspect, a color selection item (not shown) may enable selection of how many colors are used when the 2D image 105 is converted to a height map, as will be described in greater detail below. In some aspects, any number between 2 and 256 colors may be selected via the color selection item. In one embodiment, a color distance selection item (not shown) may be displayed via user interface 120, which may enable configuration of the level of detail with which to perform the edge transformation method, for example, via a slider or other range selection visualization method.

In some aspects, one or more user interface selection items may change upon selection of a different 3D transformation method 205, for example, to minimize the amount of information and selection items displayed at a given point in time in the user interface 120. This may provide for a more efficient user experience and more efficient manipulation of configuration parameters for generating a 3D object 115.

It should be appreciated that user interface 120 is only given by way of example. Other configurations, other selection items, display items, etc., may be provided or added to user interface 120 and are contemplated herein.

Figure 3:
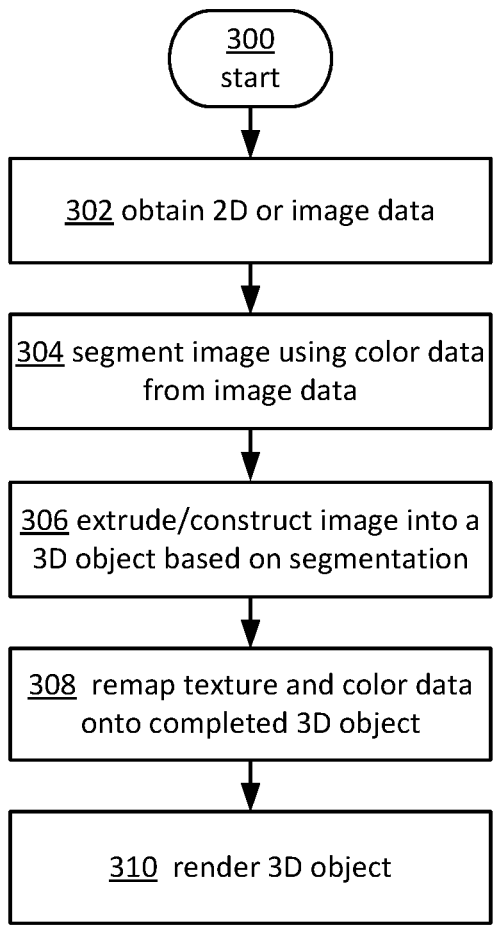
FIGS. 3 and 4 depict example operational procedures for transforming 2D image data into 3D image data.

FIG. 3 illustrates an example method or process 300 for transforming 2D image data into 3D image data. Process 300 may be implemented by a client device, or multiple client devices, servers, etc., that are in communication with one another via one or more communication networks. Process 300 may begin with operation 302, where 2D image data may be obtained. The 2D image data may correspond to image data 105 described in reference to FIG. 1. Obtaining the 2D image data may include obtaining the data via a camera or other image sensor that is connected to or in communication with the client device, or may include accessing one or more image files, etc. The obtained 2D image data may be analyzed and segmented into one or more segments based on color data from the 2D image data at operation 304. Operation 304 may include analyzing a plurality of pixels of the obtained 2D image data to determine contours loops in the image data, convert the image data to a height map, segment the image data based on detected/determined edges, and so on, as will be described in greater detail below. Next, at operation 306, the segmented image data may be extruded or constructed (e.g., a height or third dimension component added to the image data) into a 3D object, such as 3D object 115, based on the segmentation. In some aspects, the 3D object may be inverted, such as in response to receiving a selection of an invert selection.

Next, at operation 308, texture and color data may be remapped to the 3D object. In some aspects, texture may be added as additional height values to the 3D object, or may be converted to and applied as color data to the 3D object. The 3D object may then be rendered at operation 310, for example, for visualization and further modification via user interface 120. In some aspects, the 3D object or image data may be sent to a 3D printer, for example, to generate a physical 3D object according to the rendered 3D image data/3D model, optionally including texture and color.

Figure 4:
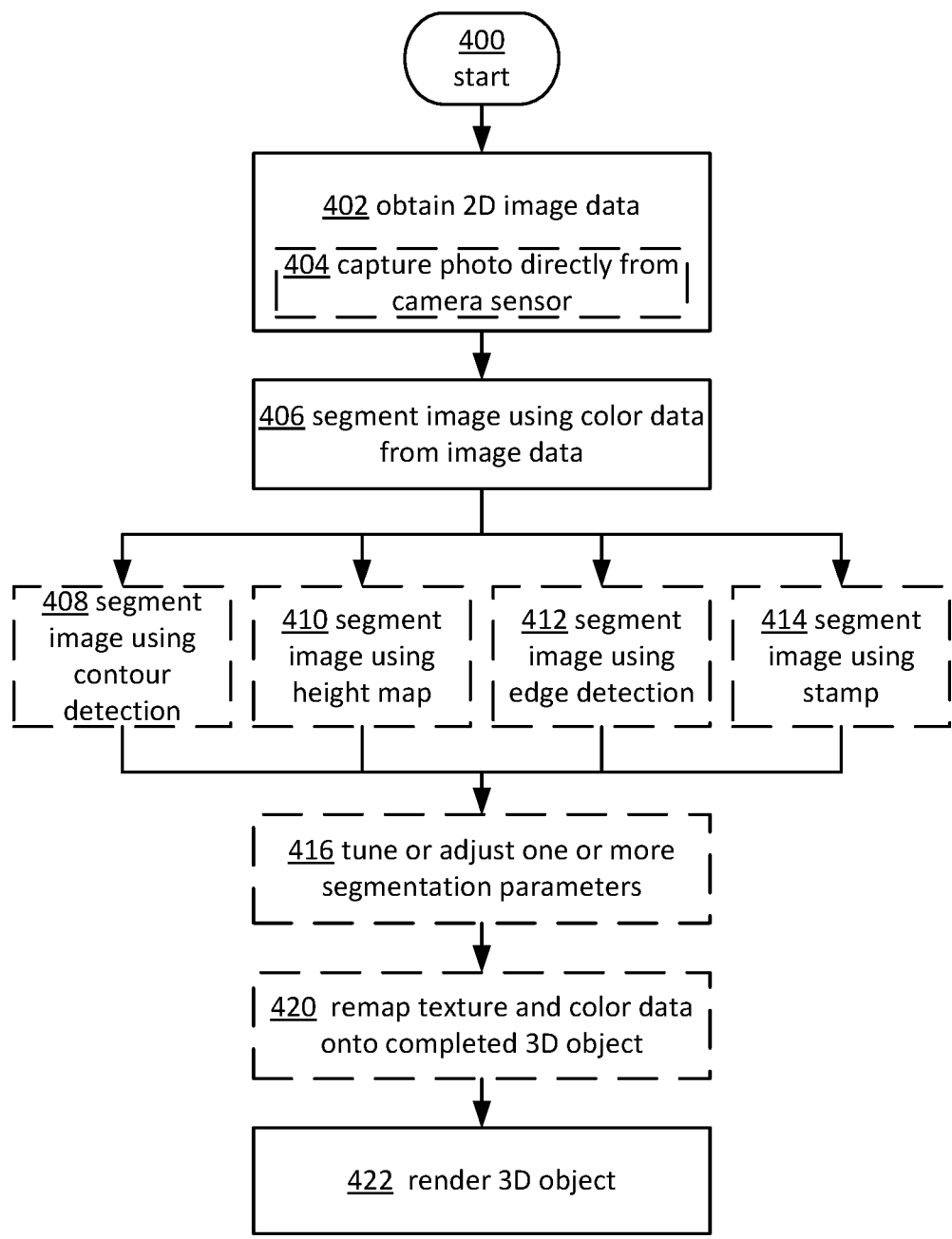

FIG. 4 illustrates a more detailed example method or process 400 for transforming 2D image data into 3D data. Process 400 may begin at operation 402, where 2D image data may be obtained, such as via capturing a photo directly from a camera sensor in communication with a client device executing process 400, at operation 404. Next, at operation 406, the image data may be segmented according to color information associated with the obtained image data. Operation 406 may be performed according to one or more 3D transformation selections 408, 410, 412, 414, received, for example, via the user interface 120. Operation 408 may include segmenting the image data using a contour detection algorithm, such that edges in the image data are detected or inferred from pixels having different intensities to define contours that may then be extruded to form a 3D object. Operation 408 will be described in greater detail below in reference to FIG. 5. Operation 410 may include segmenting the image data by preprocessing the image data, converting the image data to a height map, and generating a mesh to define the 3D image data or object. Operation 410 will be described in greater detail below in reference to FIGS. 7 and 9. Operation 412 may include segmenting the image data using edge detection, which may include generating a height map based on color distances between proximate or neighboring pixels and generating a mesh to define the 3D image data or object. Operation 412 will be described in greater detail below in reference to FIG. 11. Operation 414 may include segmenting the image data using a stamp technique, including blurring the image data, converting the image data to black and white, and constructing a mesh from a subset of the converted image data to form the 3D object or image data. Operation 414 will be described in greater detail below in reference to FIG. 13.

Once one or more of operations 408, 410, 412, and 414 have been performed on the 2D image data, process 400 may proceed to operation 416, where one or more segmentation or transformation parameters may be adjusted or tuned, for example, via instructions received through user interface 120. Operation 416 may include adjusting transformation parameters such as one or more color thresholds or intensity thresholds, blurring of the image, coloring of the image, and so on. In some cases, texture and/or color information may be remapped onto the completed 3D object at operation 420. In some aspects, one or more of operations 416, 418, and 420 may be performed as part of operations 408, 410, 412, or 414, as will be described in greater detail below. Process 400 may conclude with rendering of the 3D object or image data at operation 422.

Figure 5:
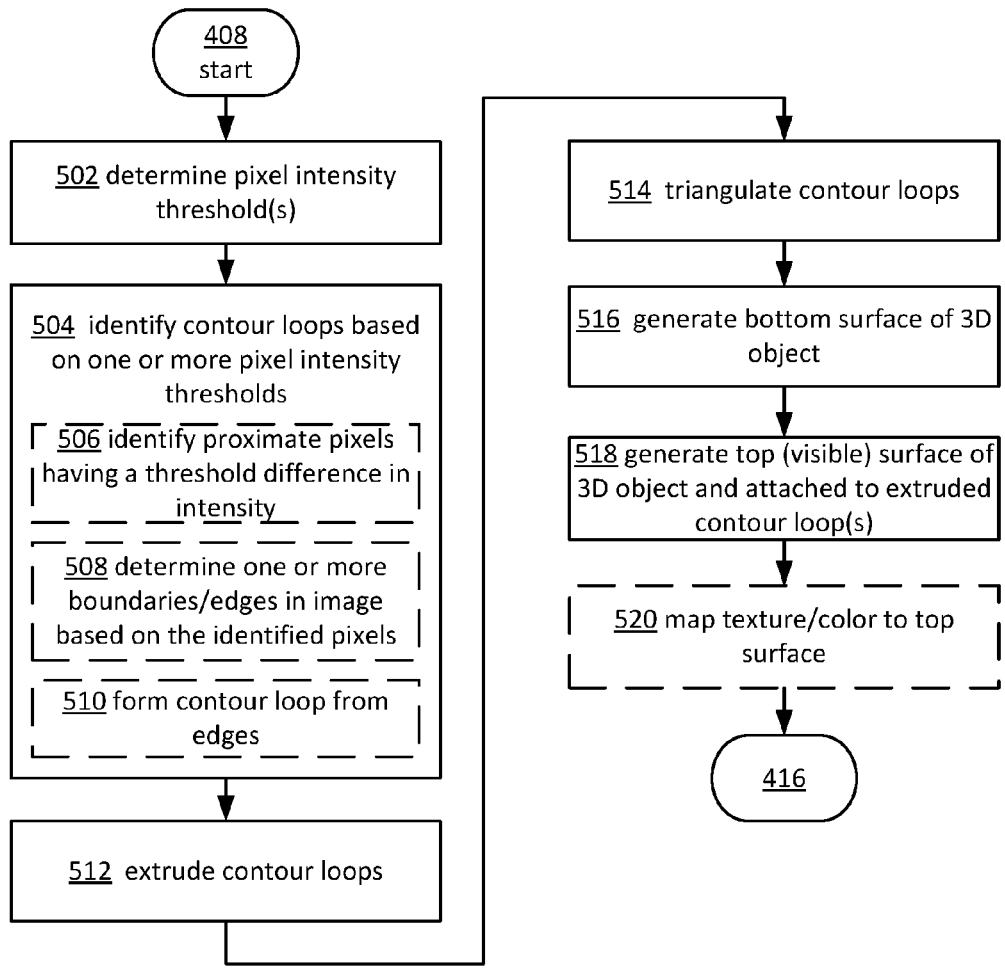
FIG. 5 depicts an example of a more detailed operational procedure for segmenting image data using contour selection.

FIG. 5 depicts an example of a more detailed sub-process for segmenting image data using contour selection of operation 408, as depicted in FIG. 4. Sub-process 408 may further include determining one or more color or pixel intensity thresholds at operation 502. Operation 502 may include receiving one or more selections via user interface 120, such as one or more intensity threshold values, for example, in the range of 1 to 255, or one or more color thresholds. Next, sub-process 408 may include identifying one or more contour loops based on the one or more pixel intensity/color thresholds determined at operation 502, at operation 504. Operation 504 may include obtaining or determining an intensity or color value of one or more pixels, and comparing that value to the determined threshold to identify one or more contour loops. In another example, operation 504 may further include identifying proximate pixels having a difference in intensity/color above the one or more thresholds, at operation 506. In some aspects, an inverse 3D image may be generated by identifying proximate pixels having a difference in intensity/color below the one or more thresholds. In some aspects, different and multiple thresholds may be applied to modify the 3D object or image data generated by process 400/sub-process 408. Operation 504 may further include determining one or more boundaries or edges in the 2D image data based on the identified pixels of operation 506, at operation 508. Determining the one or more edges may include connecting pixels having different intensities/intensities above the threshold with other pixels having different intensities/intensities above the threshold. In some aspects, at operation 510 (which may be part of operation 504), the edges may then be connected to form one or more contour loops at operations 510, which may include any shape or size, and may enclose an area within the image. In this way, the 2D image data may be segmented into one or more contour loops.

In some aspects, the pixel/color threshold(s) may include a configurable or selectable distance (difference in value or comparative value) between intensity or color levels or values of proximate pixels. A pixel threshold may include a comparative difference in value between color data of two or more pixels (e.g., 2 proximate pixels, groups of proximate pixels, 2 or more pixels within a certain distance of each other, such as pixel distance, etc.), such as values of hue, saturation, distance between specific RGB values, etc. In one example, one or more pixel thresholds may be selected to correspond to RGB data, for example, to define edges or boundaries of an image by color. In this way, the extrusion process may be driven by color. This selectable configuration may enable the conversion of a color drawing into a multi-level or multi-height extrusion or 3D object. In one example, a palette of pens (physical or in a drawing application, for example) in different colors may be used to create an image, with each color representing and corresponding to a specific extrusion depth or height. In this example, the described techniques may enable a pen artist to create a detailed 3D model with pen and paper, scan the image, and create a 3D object using the described techniques without using 3D CAD or other complex applications.

In one example, when the image data contains Alpha information, this value may be applied to RGB values, for example, of pixels in the image data, and used as the value for comparison between pixels. In another example, when the image data defines RGB values, and no Alpha values, then the color values may be converted to an intensity map. The intensity map may subsequently be converted to a black and white map or image, based on the one or more threshold values selected or configured. Contour loops may be detected based on the color of each pixel in the black and white map/image. For example, in the normal case, white may indicate a loop, while black may indicate a hole. Conversely, if the inverse option is selected, black may indicate a contour loop, and white may indicate a hole. It should be appreciated that other techniques for detecting contour loops are contemplated herein, such as tracing the RGB channels separately to get more accurate results (which may require more resources to implement).

In some aspects, the edge of the image itself may form part of a contour loop. In some aspects, multiple pixel intensity or color thresholds may be applied to the image data, to form a multi-layered representation of the image data, with each contour loop corresponding to a different height or third dimension of the image data, based on pixel intensity/color value.

Next, at operation 512, the one or more contour loops may be extruded or extended in the z-direction to form side surfaces. Next, at operation 514, the contour loops may be triangulated. In some aspects, operations 512 and 514 may be performed concurrently or in reverse order. The bottom surface, or surface opposite the surface in full view in the perspective of the 2D image data, may then be generated at operation 516. The top surface, or visible surface, of the 3D object may be generated (e.g., combined) and attached to the extruded contour loop(s), at operation 518. In some aspects, for example, where a selection for mapping color and/or texture data onto the 3D object has been received, sub-process 408 may further include mapping texture and/or color information to the top surface, at operation 520. In some cases, operation 520 may include applying UV texture coordinates to the top surface and assigning the original image data as texture to the 3D object. In examples where operation 520 is not performed, the output of sub-process 408 may be a 3D object having no color or one or more default colors (e.g., black and white).

Figure 6:
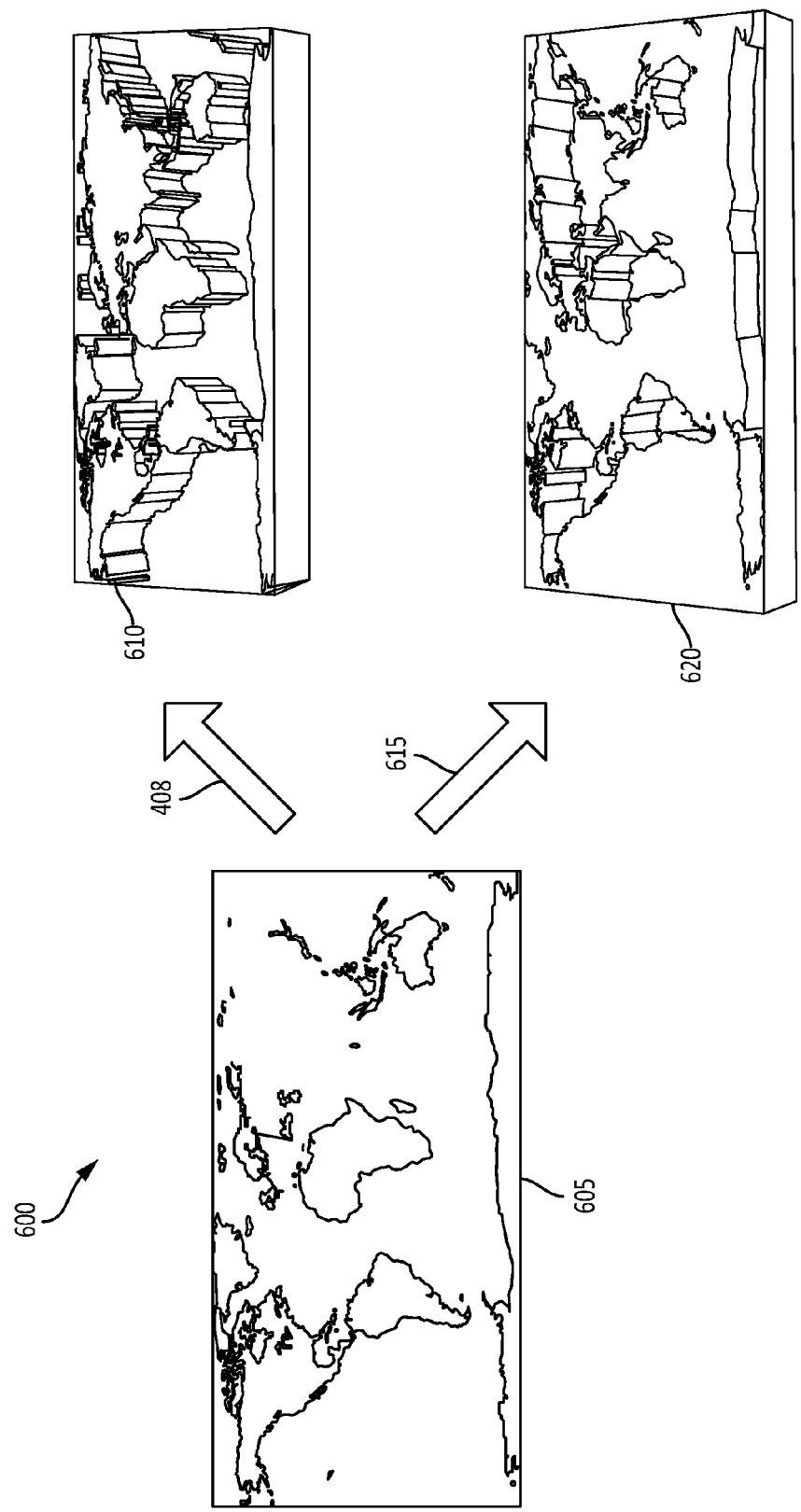
FIG. 6 depicts an example of transformations of 2D image data to 3D image data using contour selection according to the operational procedure depicted in FIG. 5.

FIG. 6 illustrates an example of transformations of 2D image data to 3D image data using contour selection according to sub-process 408 described in reference to FIG. 5. 2D image data 605, which represents a map of Earth, may be converted, in one example, to 3D image data 610 via process 400/sub-process 408. 3D image data 610 represents a normal (not inverted) contour transformation. In another example, such as when an inverted contour transformation is selected, process 400/sub-process 408 may transform 2D image data 605 into 3D image data 620 at operation 620, where instead of the land being at a higher third dimension (z direction in a Cartesian coordinate system), the water is located at a higher third dimension.

Figure 7:
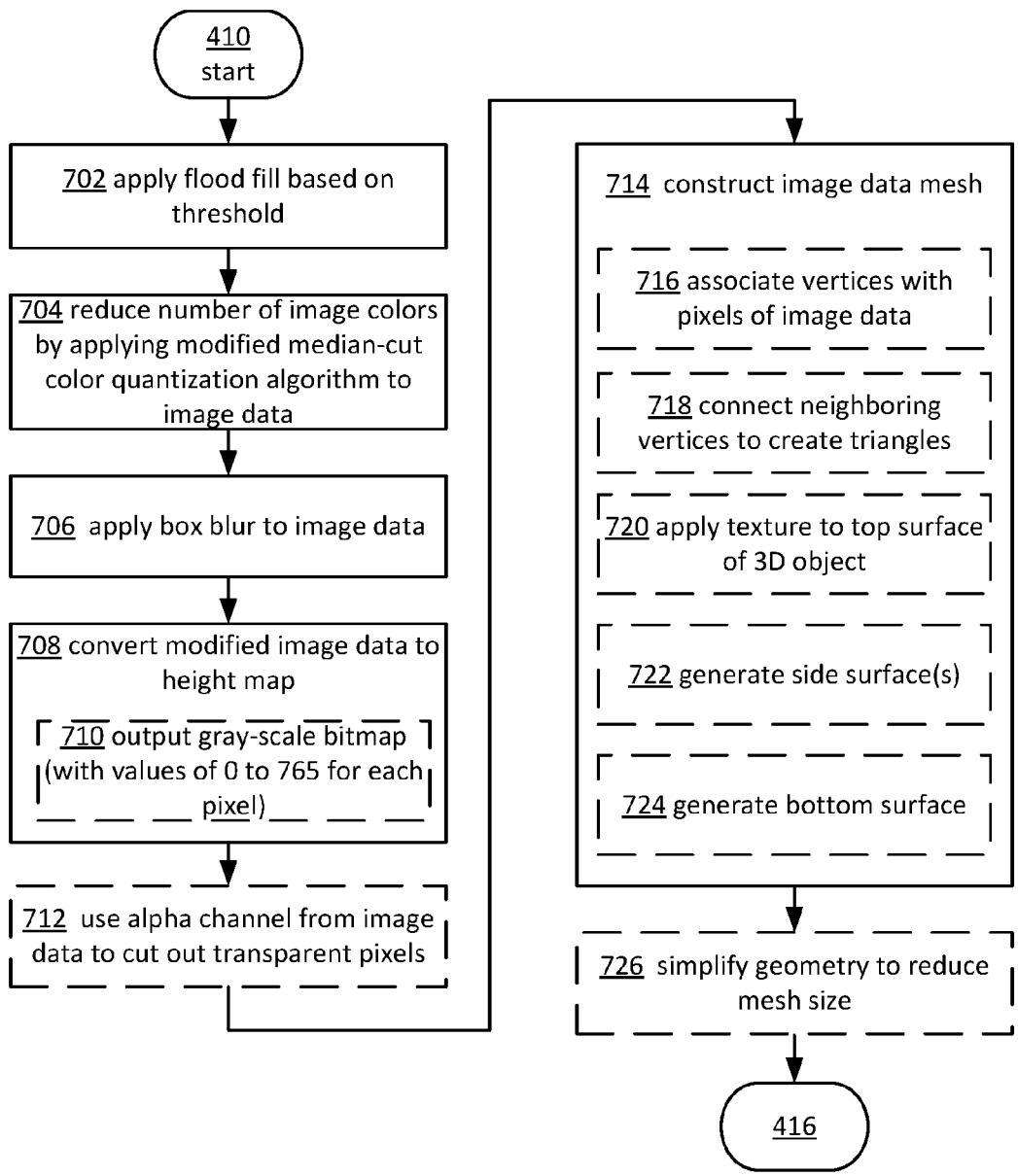
FIG. 7 depicts an example of a more detailed operational procedure for segmenting image data using one or more height maps.

FIG. 7 depicts an example of a more detailed sub-process for segmenting image data using one or more height maps of operation 410, as depicted in FIG. 4. Sub-process 410 may include applying a flood fill to the 2D image data, for example, based on one or more thresholds (which may be configurable) at operation 702. Operation 702 may be performed, for example, to reduce the number of gradients associated with the 2D image data to reduce computational complexity and resources required to perform the 3D transformation. In some aspects, the flood fill may fill in volume(s) around an object that are unnecessary to form a complete rendering of the object itself (e.g., water in a 2D image of the earth, as depicted in FIG. 6). In the example of FIG. 6, the specific contours and texture of the water may not be worth the computational overhead relative to the change in the rendered 3D object. In some aspects, the user interface 120 may provide for selection of one or more items to enable, disable, or configure the flood fill (e.g., the extent to which the flood fill is applied, for example, relative to a height of the 3D object).

Next, at operation 704, the number of colors in the 2D image data may be reduced, for example, to reduce computational complexity. In one aspect, one or more selection items may be provided via the user interface 120 for configuring how many colors are used in sub-process 410 (e.g., in the range of 2 to 256 colors). In one example, the color reduction may include applying a modified medium-cut color quantization algorithm to the 2D image data, as is known in the art.

Next, at operation 706, a blur or box blur process may be applied to the image data. In some aspects, the amount of blur applied may be in response to a selection event via a selection item in user interface 120. In one example, a blur process may include replacing one or more pixel values with a weighted average of nearby or proximate pixel values. A blur box process may include replacing one or more pixel values with a weighted average of a nearby or proximate region of pixel values defined by a box or other shape, such as an area of 5×5 pixels. The modified or preprocessed image data may then be converted to a height map at operation 708. In some aspects, operation 708 may include outputting a grey-scale bitmap corresponding to pixels of the 2D image data, with the value of each pixel in the bitmap corresponding to a height value (e.g., a value ranging from 0 to 765 for each pixel, representing the sum of R, G, and B values, which may be implemented for more efficient usage of resources in performing the conversion process). The 2D image data may include RGB color values. In some aspects, the 2D image data may also include alpha channel information. In this scenario, the alpha channel information may be used to filter out transparent pixels at operation 712, to enable more efficient construction of the 3D object/image data. In some cases, when the alpha information identifies transparent pixels, the identified pixels may be outside of a set intensity threshold, such as described in relation to FIG. 5, regardless of its intensity, so other operations need not be applied.

Next, at operation 714, an image data mesh may be constructed from the height map produced by operation 708. Operation 714 may include associating vertices with pixels of the image data at operation 716, and connecting neighboring vertices to create triangles at operation 718. Also as part of operation 714, texture may be applied to the top or visible surface of the 3D object being constructed at operation 720, and side and bottom surfaces may be generated at operations 722 and 724, respectively. Operations 716-724 may generate an enclosed 3D object. In some aspects, the geometry of the image data mesh may be simplified to reduce the size of the 3D image data created, at operation 726. Operation 726 may be performed throughout or at various points of sub-process 410.

Figure 8:
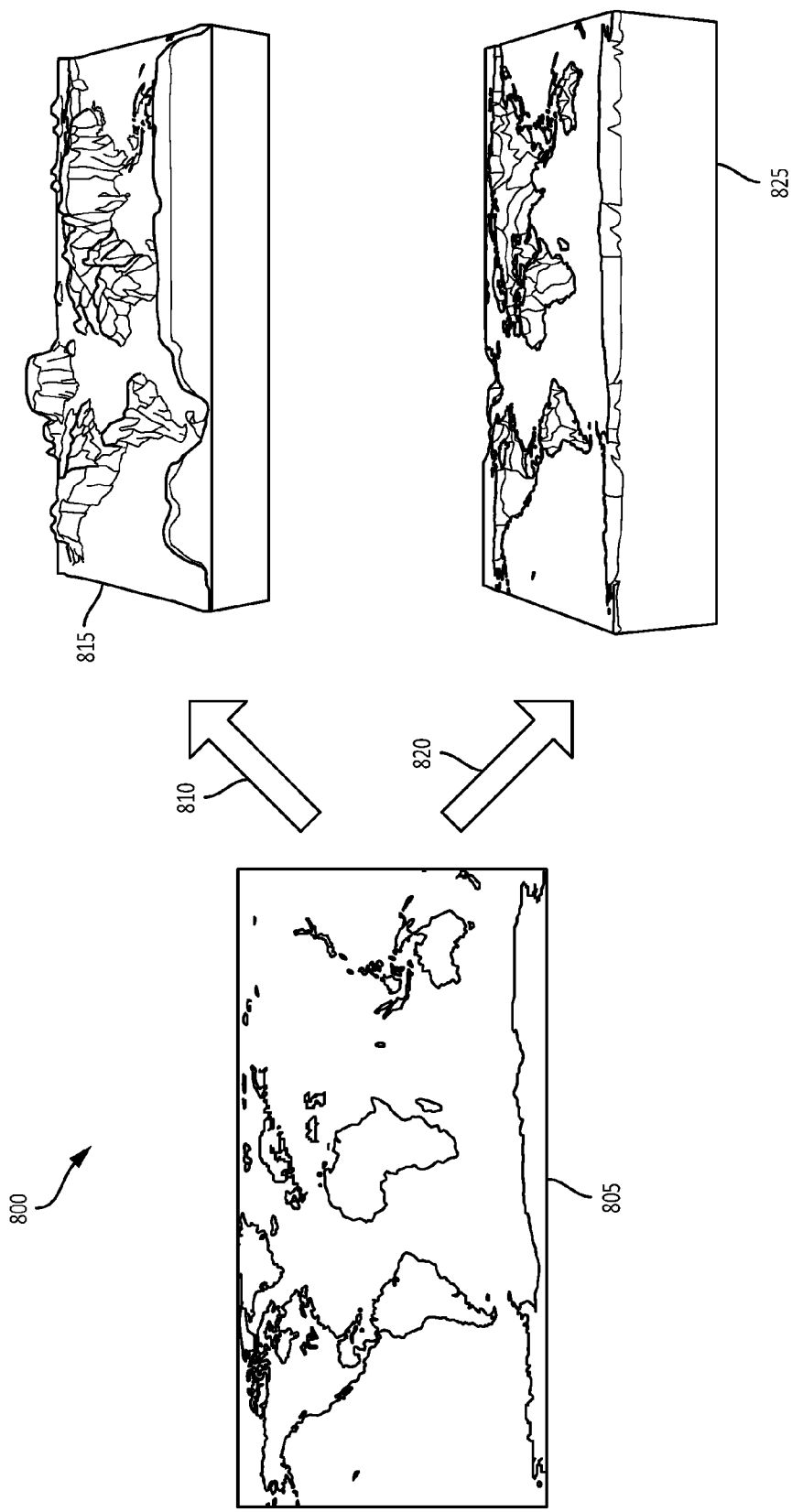
FIG. 8 depicts an example of transformations of 2D image data to 3D image data using one or more height maps according to the operational procedure depicted in FIG. 7.

FIG. 8 illustrates an example of transformations of 2D image data to 3D image data using one or more height maps according to process 400/sub-process 410 described in reference to FIG. 7. In one example, 2D image data 805, which may depict the Earth, may be obtained and subsequently transformed at 810 via process 400/sub-process 410 to 3D image data 815. 3D image data 815 may represent the 2D image data 805 with a height or elevation dimension added thereto. In another example, 2D image data 805 may be transformed at 820 via process 400/sub-process 410 into inverted 3D image data 825. Inverted 3D image data may be similar to 3D image data 815, except that elevation or height values are reversed or have the opposite sign. By adjusting the number of colors used for generating the height map, the resolution or detail at which different heights or elevations are mapped may be adjusted, such that more colors used may result in more detailed or higher height resolution 3D image data 815, 825.

Figure 9:
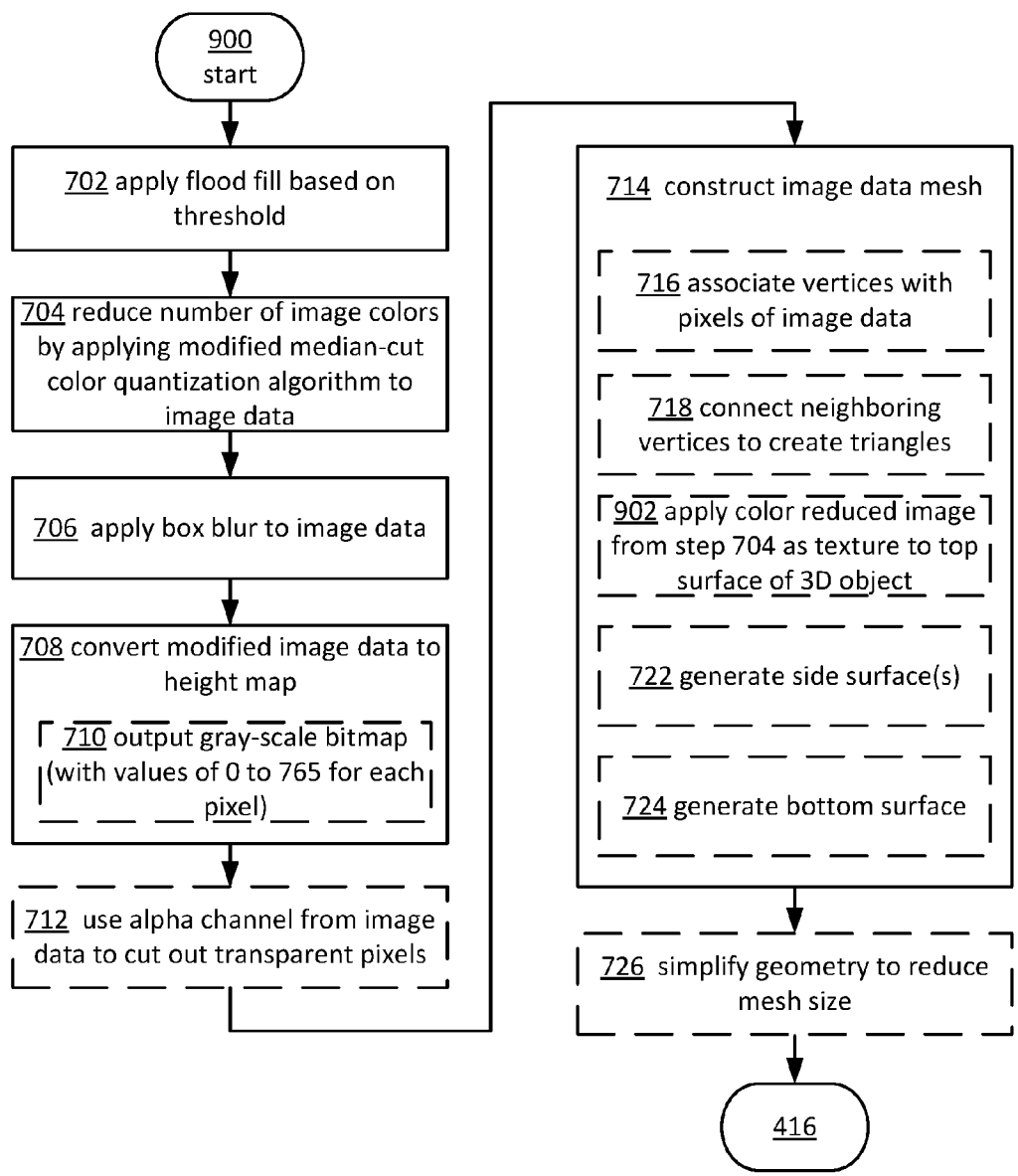
FIG. 9 depicts another example of an operational procedure for segmenting image data using one or more height maps.

FIG. 9 depicts another example of a more detailed sub-process 900 for segmenting image data using one or more height maps of operation 410, as depicted in FIG. 4. Sub-process 900 may include one or more of the steps or operations of sub-process 410, as described in reference to FIG. 7. Accordingly, common operations will not be described again here. Sub-process 900 differs from sub-process 410 of FIG. 7 in one primary aspect. Instead of applying texture (e.g., from the original 2D image data) to the top surface of the 3D object at operation 720, sub-process 900 may instead use the color reduced image data from operation 704 to generate and apply texture to the top surface of the 3D object at operation 902. In some aspects, generating a 3D object using full resolution texture information may produce an aesthetically un-appealing 3D object, such that the texture may overpower other details of the 3D object. Process 900 may be used to apply simplified color information in the form of a reduced color texture to create a more aesthetically appealing 3D object. In one example, process 900 may produce a 3D objects similar or akin to a children' puzzles or simplified cartoon characters. Operation 902 may be performed as part of constructing the image data mesh at operation 714.

Figure 10:
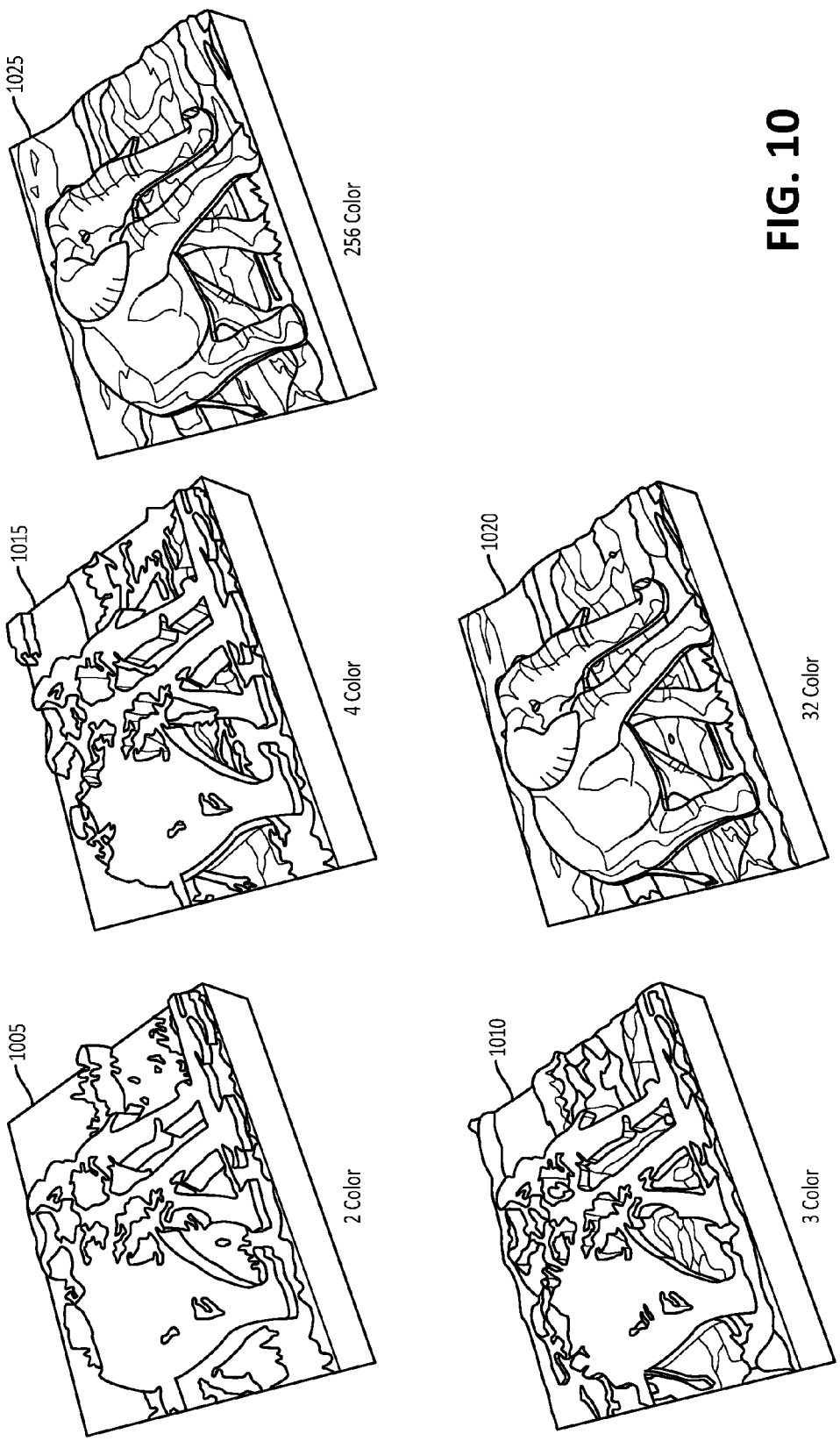
FIG. 10 depicts an example of transformations of 2D image data to 3D image data using one or more height maps according to the operational procedure depicted in FIG. 9.

FIG. 10 illustrates example 3D transformations using one or more height maps according to sub-process 900 described above in reference to FIG. 9. 3D image data 1005 illustrates a scene including an elephant, transformed using process 400/sub-process 900, with 2 colors used for the color reduction at operation 704. The texture of 3D image data 1005 corresponds to the 2 color reduction of operation 704, applied via operation 902. Similarly, 3D image data 1010 corresponds to 3 colors, 3D image data 1015 corresponds to 4 colors, 3D image data 1020 corresponds to 32 colors, and 3D image data 1025 corresponds to 256 colors. As illustrated, more colors used results in better resolution and appearance of the produced 3D image data. Accordingly, a different number of colors used for the color reduction may be selected, for example, via user interface 120, to affect the 3D image data produced.

Figure 11:
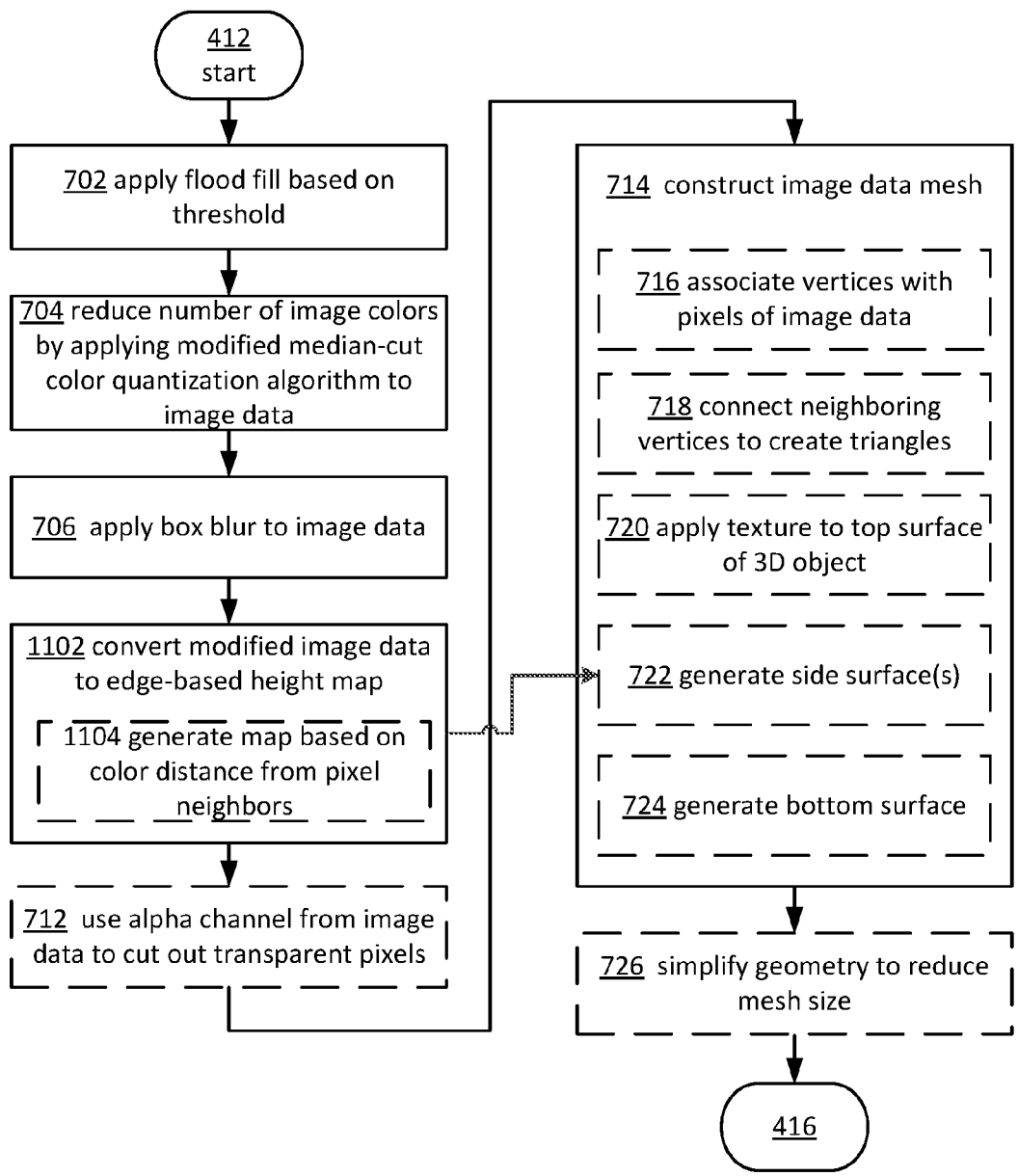
FIG. 11 depicts an example of a more detailed operational procedure for segmenting image data using edge detection.

FIG. 11 depicts an example of a more detailed sub-process for segmenting image data using edge detection of operation 412, as depicted in FIG. 4. Sub-process 412 may be similar in many respects to sub-process 410, including operations 702, 704, 706, 712, 714, 716-724, and 726. Sub-process 412 may differ from sub-process 410 in that instead of generating a height map at operation 708, sub-process 412 may include converting the preprocessed 2D image data to an edge based height map at operation 1102. In some aspects, prior to or as part of operation 1102, a Sobel filter, or other technique to determine an approximation of the gradient of the image intensity function, may be applied to the obtained image data. Operation 1102 may further include generating a bitmap based on color distances between proximate or neighboring pixels, at operation 1104, for example after the Sobel filter has been applied. Operating 1104 may include calculating height based on the size of the gradient of each pixel, which is related to how different the neighboring pixels are to a current pixel, instead of calculating height based on the intensity of each pixel. In some cases, instead of building the 3D object by defining contour loops or edges based on the locations of pixels that have intensity/color values above a threshold, the 3D object may be built based on edges or contour loops defined by where sharp transitions (e.g., based on gradient values) occur in the image data.

Figure 12:
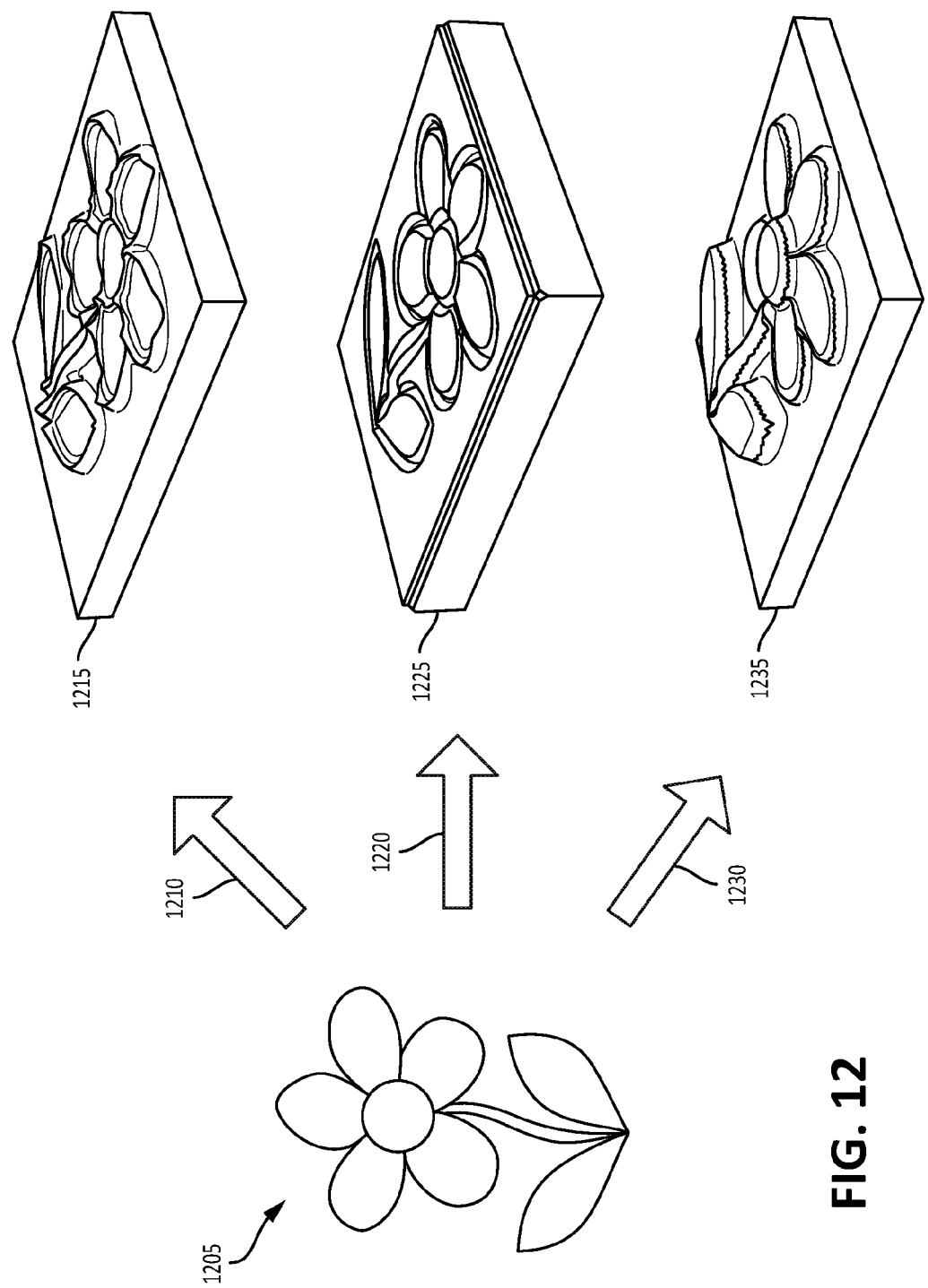
FIG. 12 depicts an example of transformations of 2D image data to 3D image data using edge detection according to the operational procedure depicted in FIG. 11.

FIG. 12 illustrates two example 3D transformations using edge detection according to process 400/sub-process 412 described in reference to FIG. 11, and one example 3D transformation using one or more height maps according to process 400/sub-process 410 described in reference to FIG. 7. In the example illustrated, 2D image data 1205 may include a picture of a flower. 2D image data 1205 may be transformed at 1210 according to process 400/sub-process 412 to 3D image data 1215. 3D image data 1215 may include the flower depicted in 2D image data 1205 with raised edges corresponding to the stem, leaves, and flower pedals, for example. In another example, 2D image data may be transformed at 1220 according to process 400/sub-process 412 to 3D image data 1225, which is similar to 3D image data 1215, but inverted (e.g., according to a selection received via user interface 120) with edges corresponding to depressed areas rather than raised areas. For comparison, 2D image data 1205 may be transformed at 1230 according to process 400/sub-process 410 (height map) to 3D image data 1235, which may be differ from 3D image data 1215 by including more raised or elevated areas in the interior of the flower, for example.

Figure 13:
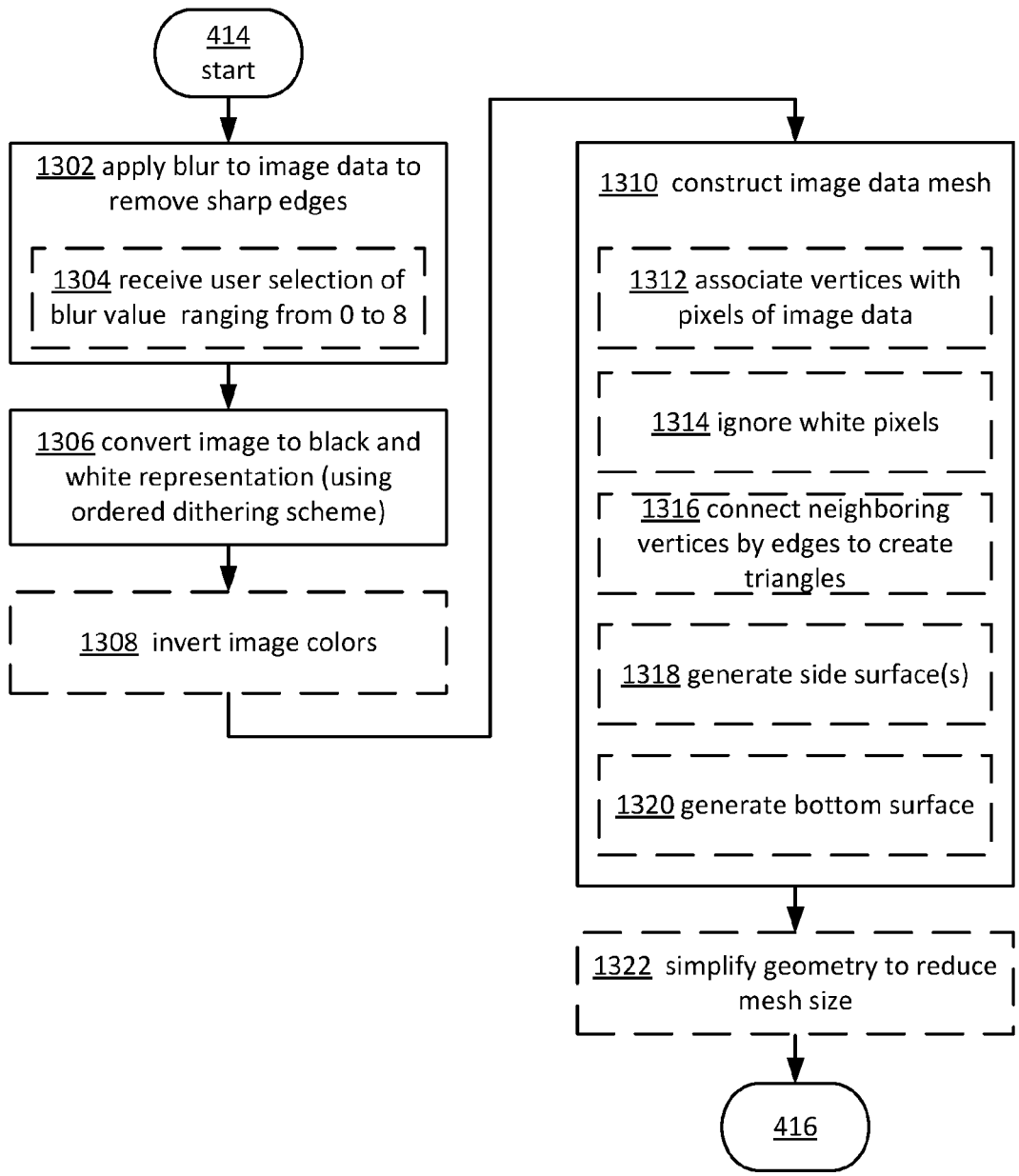
FIG. 13 depicts an example of a more detailed operational procedure for segmenting image data using a stamp technique.

FIG. 13 depicts an example of a more detailed sub-process for segmenting image data using the stamp technique of operation 414, as depicted in FIG. 4. Sub-process 414 may begin at operation 1302, where blur may be applied to the 2D image data (e.g., 2D image data 105), for example, to remove sharp edges from the 2D image data. In some aspects, the blur applied in operation 1302 may be based on a received selection of a blur value ranging from values of 0 to 8, for example, via user interface 120, at operation 1304. Next, at operation 1306, the blurred 2D image data may be converted to a black and white image, for example using an ordered dithering scheme, as is known in the art (e.g., creating a grey-scale image by placing small black dots closer together or farther apart). In some aspects, at operation 1308, the image colors may be inverted, for example, to generate a reverse stamp 3D object.

Next, at operation 1310, an image data mesh may be constructed. Operation 1310 may include further operations, such as associating vertices with pixels of the image data at operation 1312, ignoring white pixels at operation 1314, and connecting neighboring vertices, for example, of black pixels, by edges to create triangles at operation 1316. Operations 1312, 1314, and 1316 may turn the system of black and white dots, now represented as pixels, into small towers and holes, such that when manufactured and pressed to an ink pad, the pattern of dots will be transferred by ink to the page that is stamped. Operation 1310 may further include generating side surface(s) and generating a bottom surface at operations 1318 and 1320, respectively. In this way, a 3D object may be constructed, with at least one surface representing a stamp or stamp-like characteristics of the 2D image data. In some aspects, the geometry of the 3D object/stamp may be simplified to reduce the size of the mesh at operation 1322, such that the 3D object takes less space to store, may be rendered with less resources, etc.

Figure 14A:
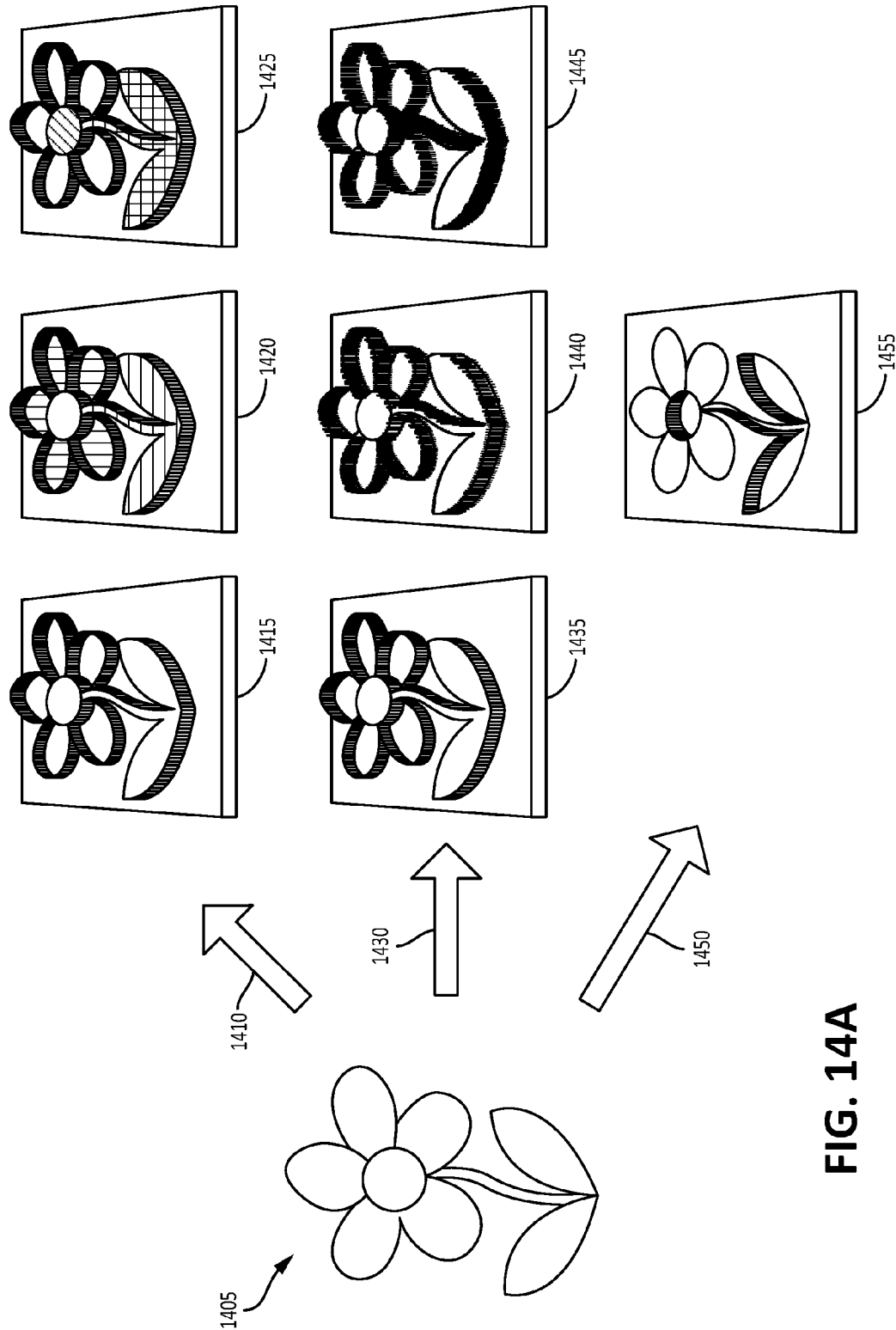

FIGS. 14A and 14B illustrate example transformations of 2D image data to 3D image data using the stamp technique according to process 400/sub-process 414 described in reference to FIG. 13. 2D image data 1405, which may include a picture of a flower, may be transformed at 1410, 1430, and 1450, and 1460 via process 400/sub-process 414 to generate various versions of 3D image data 1415, 1420, 1425, 1435, 1440, 1445, 1455, and 1465. In a first example, 2D image data 1405 may be transformed at 1410 to various qualities of 3D image data 1415, 1420, 1425, with different areas of the flower being filled with different patterns, for example. In a second example, 2D image data 1405 may be transformed at 1430 to various versions of 3D image data 1435, 1440, 1445 having different blur values or levels applied thereto. In a third example, 2D image data 1405 may be transformed at 1450 to an inverted stamp 1455, for example, with a first quality and a minimum blur value. In yet a fourth example, 2D image data 1405 may be transformed at 1460 to 3D image data 1465, illustrated in perspective view, with all or a majority of the "columns" or "bumps" that define the interior areas of the flower having the same height. It should be appreciated that various variations and configurations of columns or bumps, having differing heights, are also contemplated herein.

Figure 15:
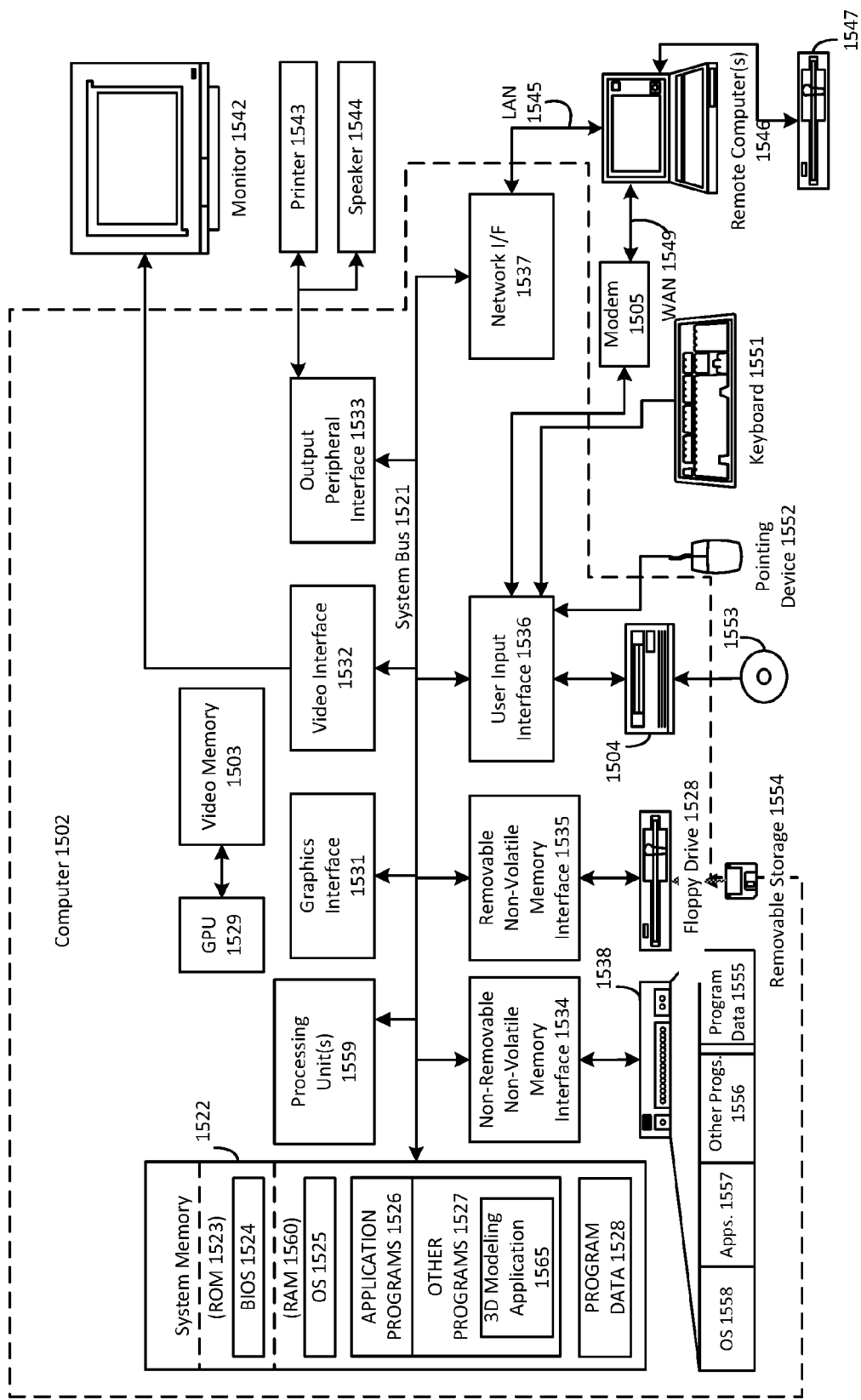
FIG. 15 depicts an example general purpose computing environment in which the techniques described herein may be embodied.

The 3D modeling or builder application and/or user interface 120 described above may be implemented on one or more computing devices or environments, as described below. FIG. 15 depicts an example general purpose computing environment in which some of the techniques described herein may be embodied. The computing system environment 1502 is only one example of a suitable computing environment and is not intended to suggest any limitation as to the scope of use or functionality of the presently disclosed subject matter. Neither should the computing environment 1502 be interpreted as having any dependency or requirement relating to any one or combination of components illustrated in the example operating environment 1502. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1502, which may include any of a mobile device or smart phone, tablet, laptop, desktop computer, etc., typically includes a variety of computer-readable media. Computer-readable media can be any available media that can be accessed by computer 1502 and includes both volatile and nonvolatile media, removable and non-removable media. The system memory 1522 includes computer-readable storage media in the form of volatile and/or nonvolatile memory such as read only memory (ROM) 1523 and random access memory (RAM) 160. A basic input/output system 1524 (BIOS), containing the basic routines that help to transfer information between elements within computer 1502, such as during start-up, is typically stored in ROM 1523. RAM 1560 typically contains data and/or program modules that are immediately accessible to and/or presently being operated on by processing unit 1559. By way of example, and not limitation, FIG. 15 illustrates operating system 1525, application programs 1526, other program modules 1527, and program data 1528.

The computer 1502 may also include other removable/non-removable, volatile/nonvolatile computer storage media. By way of example only, FIG. 15 illustrates a hard disk drive 1538 that reads from or writes to non-removable, nonvolatile magnetic media, a magnetic disk drive 1539 that reads from or writes to a removable, nonvolatile magnetic disk 1554, and an optical disk drive 14 that reads from or writes to a removable, nonvolatile optical disk 1553 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1538 is typically connected to the system bus 1521 through a non-removable memory interface such as interface 1534, and magnetic disk drive 1539 and optical disk drive 1504 are typically connected to the system bus 1521 by a removable memory interface, such as interface 1535.

The drives and their associated computer storage media discussed above and illustrated in FIG. 15, provide storage of computer-readable instructions, data structures, program modules and other data for the computer 1502. In FIG. 15, for example, hard disk drive 1538 is illustrated as storing operating system 1558, application programs 1557, other program modules 1556, and program data 1555. Note that these components can either be the same as or different from operating system 1525, application programs 1526, other program modules 1527, and program data 1528. Operating system 1558, application programs 1557, other program modules 1556, and program data 1555 are given different numbers here to illustrate that, at a minimum, they are different copies. A user may enter commands and information into the computer 1502 through input devices such as a keyboard 1551 and pointing device 1552, commonly referred to as a mouse, trackball or touch pad. Other input devices (not shown) may include a microphone, joystick, game pad, satellite dish, scanner, or the like. These and other input devices are often connected to the processing unit 1559 through a user input interface 1536 that is coupled to the system bus, but may be connected by other interface and bus structures, such as a parallel port, game port or a universal serial bus (USB). A monitor 1542 or other type of display device is also connected to the system bus 1521 via an interface, such as a video interface 1532. In addition to the monitor, computers may also include other peripheral output devices such as speakers 1544 and printer 1543, such as a 3D printer, which may be connected through an output peripheral interface 1533.

The computer 1502 may operate in a networked environment using logical connections to one or more remote computers, such as a remote computer 1546. The remote computer 1546 may be a personal computer, a server, a router, a network PC, a peer device or other common network node, and typically includes many or all of the elements described above relative to the computer 1502, although only a memory storage device 1547 has been illustrated in FIG. 15. The logical connections depicted in FIG. 15 include a local area network (LAN) 1545 and a wide area network (WAN) 1549, but may also include other networks. Such networking environments are commonplace in offices, enterprise-wide computer networks, intranets and the Internet.

When used in a LAN networking environment, the computer 1502 is connected to the LAN 1545 through a network interface or adapter 1537. When used in a WAN networking environment, the computer 1502 typically includes a modem 1505 or other means for establishing communications over the WAN 1549, such as the Internet. The modem 1505, which may be internal or external, may be connected to the system bus 1521 via the user input interface 1536, or other appropriate mechanism. In a networked environment, program modules depicted relative to the computer 1502, or portions thereof, may be stored in the remote memory storage device. By way of example, and not limitation, FIG. 15 illustrates remote application programs 1548 as residing on memory device 1547. It will be appreciated that the network connections shown are example and other means of establishing a communications link between the computers may be used.

In some aspects, other programs 1527 may include a 3D modeling or builder application 1565 that provides the functionality as described above. In some cases, the 3D modeling application 1565 may execute processes 300 or 400, and sub-processes 408, 410, 412, 414, or 900 and provide a user interface 120, as described above, through graphics interface 1531, video interface 1532, output peripheral interface 1533, and/or one or more monitors or touch screen devices 1542. In some aspects, the 3D modeling application 1565 may communicate with 3D printer 1543 to produce a physical 3D model of the 3D image data. In some aspects, other programs 1527 may include one or more 3D virtualization applications that may obtain and provide images that may be displayed of 3D models generated by 3D modeling application 1565.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for generating a three dimensional (3D) model with reduced user input, the system comprising a processor and memory, the system programmed to perform the following operations:
    receive two dimensional (2D) image data or partial 3D image data of an object, the 2D image data or the partial 3D image data including color information;
    segment the 2D image data or the partial 3D image data into a plurality of segments based on the color information;
    identify one or more of segments around the object that include gradients in pixels;
    based on the identifying, apply a flood fill to the one or more segments around the object to remove the gradients;
    convert the 2D image data or the partial 3D image data into a height map based on the color information and the applied flood fill; and
    construct an image data mesh using the height map to form a 3D model that includes the applied flood fill to reduce a number of gradients associated with the 2D image data or the partial 3D image data.

2. The system of claim 1, wherein the system is further programmed to perform the following operations:
    associate vertices with pixels of the 2D image data or the partial 3D image data;
    connect neighboring vertices to define at least one surface of the 3D model;
    apply texture to a top surface of the 3D model; and
    generate bottom and side surfaces to enclose a volume within the 3D model.

3. The system of claim 1, wherein the system is further programmed to perform the following operations:
    generate a grey-scale bitmap corresponding to pixels comprising the 2D image data or the partial 3D image data to produce the height map.

4. The system of claim 1, wherein the height map comprises an edge-based height map, and wherein converting the 2D image data or the partial 3D image data into the edge-based height map further comprises:
    determining color distances between pixels comprising the 2D image data or the partial 3D image data; and
    mapping the determined color distances to form edges in the 2D image data or the partial 3D image data.

5. The system of claim 1, wherein applying the flood fill to the one or more of the plurality of segments around the object comprises applying the flood fill to two or more of the plurality of segments around the object.

6. The system of claim 1, wherein the system is further programmed to perform at least one of the following operations:
    apply modified median-cut quantization to the 2D image data or the partial 3D image data to reduce a number of colors in the color information; or
    apply blur or box blur to the 2D image data or the partial 3D image data, before converting the 2D image data or the partial 3D image data into the height map.

7. The system of claim 1, wherein the system further comprises a 3D printer, and wherein the system is further programmed to perform the following operations:
    print a 3D object based on the 3D model.

8. A method for transforming image data into a three dimensional (3D) model by a computing device, the method comprising:
    obtaining two dimensional (2D) image data or partial 3D image data of an object, the 2D image data or the partial 3D image data including color information;
    segmenting the 2D image data or the partial 3D image data into a plurality of segments based on the color information;
    identifying one or more of segments around the object that include gradients in pixels;
    based on the identifying, applying a flood fill to the one or more segments around the object to remove the gradients;
    converting the 2D image data or the partial 3D image data into a height map based on the color information and the applied flood fill; and constructing an image data mesh using the height map to form a 3D model that includes the applied flood fill to reduce a number of gradients associated with the 2D image data or the partial 3D image data.

9. The method of claim 8, further comprising:
associating vertices with pixels of the 2D image data or the partial 3D image data;
connecting neighboring vertices to define at least one surface of the 3D model;
applying texture to a top surface of the 3D model; and
generating bottom and side surfaces to enclose a volume within the 3D model.

10. The method of claim 8, further comprising:
generating a grey-scale bitmap corresponding to pixels comprising the 2D image data or the partial 3D image data to produce the height map.

11. The method of claim 8, wherein the height map comprises an edge-based height map, and wherein converting the 2D image data or the partial 3D image data into the edge-based height map further comprises:
determining color distances between pixels comprising the 2D image data or the partial 3D image data; and
mapping the determined color distances to form edges in the 2D image data or the partial 3D image data.

12. The method of claim 8 further comprising:
applying modified median-cut quantization to the 2D image data or the partial 3D image data to produce reduced-color image data.

13. The method of claim 12, further comprising:
associating vertices with pixels of the reduced-color image data;
connecting neighboring vertices to define at least one surface of the 3D model;
applying the color reduced image data as texture to a top surface of the 3D model; and
generating bottom and side surfaces to enclose a volume within the 3D model.

14. The method of claim 8, further comprising at least one of:
applying modified median-cut quantization to the 2D image data or the partial 3D image data to reduce a number of colors in the color information; or
applying blur or box blur to the 2D image data or the partial 3D image data, before converting the 2D image data or the partial 3D image data into the height map.

15. The method of claim 8, further comprising:
applying blur to the 2D image data or the partial 3D image data; and
converting the blurred 2D image data or the partial 3D image data to black and white image data; and
wherein the 3D model comprises a stamp.

16. The method of claim 15, further comprising:
inverting image colors of the black and white image data, wherein constructing the image data mesh using the height map further comprises ignoring white pixels of the inverted black and white image data.

17. A computer readable storage device having stored thereon instructions that, upon execution by at least one processor, cause the at least one processor to perform operations for transforming image data into a three-dimensional (3D) model, the operations comprising:
obtaining two dimensional (2D) image data or partial 3D image data of an object, the 2D image data or the partial 3D image data including color information;
segmenting the 2D image data or the partial 3D image data into a plurality of segments based on the color information;
identifying one or more of segments around the object that include gradients in pixels;
based on the identifying, applying a flood fill to the one or more segments around the object to remove the gradients;
converting the 2D image data or the partial 3D image data into a height map based on the color information and the applied flood fill; and
constructing an image data mesh using the height map to form a 3D model that includes the applied flood fill to reduce a number of gradients associated with the 2D image data or the partial 3D image data.

18. The computer readable storage device of claim 17, wherein the instructions, upon execution by the at least one processor, cause the at least one processor to perform additional operations of:
associating vertices with pixels of the 2D image data or the partial 3D image data;
connecting neighboring vertices to define at least one surface of the 3D model;
applying texture to a top surface of the 3D model; and
generating bottom and side surfaces to enclose a volume within the 3D model.

19. The computer readable storage device of claim 17, wherein the instructions, upon execution by the at least one processor, cause the at least one processor to perform additional operations of:
generating a grey-scale bitmap corresponding to pixels comprising the 2D image data or the partial 3D image data to produce the height map.

20. The computer readable storage device of claim 17, wherein the height map comprises an edge-based height map, and wherein the instructions for converting the 2D image data or the partial 3D image data into the edge-based height map further comprise instructions for:
determining color distances between pixels comprising the 2D image data or the partial 3D image data; and
mapping the determined color distances to form edges in the 2D image data or the partial 3D image data.

* * * * *